United States Patent [19]
Guichard et al.

[11] Patent Number: 5,510,846
[45] Date of Patent: Apr. 23, 1996

[54] PROCESS FOR SYNCHRONIZING THE SCANNING CIRCUIT OF AN IMAGE DISPLAY DEVICE

[75] Inventors: Jacques Guichard, Paris; Gérard Eude, Torcy, both of France

[73] Assignee: France Telecom, Paris, France

[21] Appl. No.: 244,148

[22] PCT Filed: Nov. 19, 1992

[86] PCT No.: PCT/FR92/01073

§ 371 Date: May 18, 1994

§ 102(e) Date: May 18, 1994

[87] PCT Pub. No.: WO93/10627

PCT Pub. Date: May 27, 1993

[30] Foreign Application Priority Data

Nov. 20, 1991 [FR] France .................... 91 14316

[51] Int. Cl.$^6$ .................................. H04N 5/907
[52] U.S. Cl. .................. 348/511; 348/512; 348/513; 348/715; 348/439; 348/718
[58] Field of Search .................... 348/500, 511, 348/513, 512, 715, 718, 439; H04N 5/907

[56] References Cited

U.S. PATENT DOCUMENTS

| | | |
|---|---|---|
| 2,906,814 | 7/1956 | Kretzmer .................... 348/439 |
| 4,007,328 | 2/1977 | Mosca . |
| 4,027,100 | 5/1977 | Ishiguro . |
| 4,494,141 | 1/1985 | Altekruse .................... 358/111 |
| 4,562,466 | 12/1985 | Clapp et al. . |
| 4,698,676 | 10/1987 | Kubota et al. . |
| 4,837,632 | 6/1989 | Kubo et al. . |
| 5,146,325 | 9/1992 | Ng .................... 348/439 |
| 5,293,231 | 3/1994 | Elberbaum et al. .................... 348/500 |
| 5,343,256 | 8/1994 | Kimura et al. .................... 348/439 |

FOREIGN PATENT DOCUMENTS

| | | |
|---|---|---|
| 0360026 | 8/1989 | European Pat. Off. . |
| 2191906 | 12/1987 | United Kingdom . |

OTHER PUBLICATIONS

Globecom '85 IEEE Global Telecommunications Conference IEEE #85CH2190-7, Conference Record Vol. 2 of 3. Dec. 2-5, 85.

Video–Konferenzsystem Mit 2,048 MBit/s, J. Ost Und H. Wendt Fernseh Und Kino–Technik 20 Jahrgang—NR Oct. 1975 pp. 328–330.

*Primary Examiner*—James J. Groody
*Assistant Examiner*—Glenton B. Burgess
*Attorney, Agent, or Firm*—Cesari and McKenna

[57] ABSTRACT

A process for synchronizing a scanning circuit of a device for the display of images acquired by a camera having a scanning circuit controlled by a given acquisition clock. The device comprises an input buffer, a processor making it possible to reconstitute each image entering the buffer, a display store in which the images are recorded after processing and a controller able to control the reading or writing of the images in the display store. The process is characterized in that it consists of applying to the scanning circuit an arbitrary clock signal independent of the image synchronization of the signal received. Also, the reading and writing of the display store is controlled in order to obtain repetitions or suppressions of images on display thus absorbing any delay or advance. Further, the processor should have a faster than necessary image compression (average time of one image).

8 Claims, 1 Drawing Sheet

PROCESS FOR SYNCHRONIZING THE SCANNING CIRCUIT OF AN IMAGE DISPLAY DEVICE

BACKGROUND OF THE INVENTION

The invention relates to a process for synchronizing the scanning circuit of an image display device, said images having been acquired by a camera having a scanning circuit controlled by a given acquisition clock.

The process is applicable to videophone, videophone conference, television and remote monitoring equipment.

In an analog video transmission, synchronization pulses are regularly inserted in the image signal. They indicate the starts of images and the starts of lines.

The display device or monitor in the case of videophony, is synchronized with said reference pulses, which enables it to display the start of the image at the top left and the starts of the lines along the left-hand edges. Therefore an analog video signal contains two reference frequencies, namely the line frequency and the frame frequency.

However, in the case of the transmission of analog signals on a wideband network in the case of videophony, that there was a scrolling of a shadow superimposed on the displayed scene. Thus, in analog transmission on the wideband network in videophony (FIG. 1), the video signal from the camera A reaches the monitor B without any significant deformation and this also applies to the signal from camera B to monitor A. The scanning circuits of the monitor B are therefore controlled by the signal from the camera A. However, there is no reason why the scans of the camera B are identical to those of the camera A. The camera and monitor B of a videophone or picture phone are located very close to one another and the influences by radiation of their scanning circuit lead to said scrolling. The speed of the latter corresponds to the frequency shift between the two scans.

In the case of a digital video transmission, where the signals have been compressed by a coder in order to be transmitted, these line and frame frequencies are no longer transmitted as regular, periodic patterns.

By eliminating space and time redundancies by known image compression methods, the number of bits per image becomes variable. Code words characterizing the starts of images are transmitted, but they are no longer separated by equal times and no longer constitute a clock cycle with which the reception device can be synchronized. The line synchronization may no longer be transmitted.

The reception device making it possible to display these images has a decoder making it possible to reconstruct the originally compressed images, so as to record entire images in display storage means, but at variable times dependent on the number of bits transmitted per image and the power of the decoder.

Therefore the scan synchronization problems have not hitherto been solved in a satisfactory manner.

SUMMARY OF THE INVENTION

The present invention makes it possible to solve these problems. The invention more particularly relates to a synchronization process making it possible to have a scanning system of the asynchronous device, independent of the synchronization of the images which it receives and not disturbed by a time base of another scanning system in the vicinity thereof.

The present invention more particularly relates to a process for synchronizing the scanning circuit of a display device for images acquired by a camera having a scanning circuit controlled by a given acquisition clock, said device having an input buffer, processing means making it possible to reconstitute each image entering the buffer, display storage means in which the images are recorded after processing and control means able to control the writing and reading of images in the display storage means, characterized in that it consists of applying to the scanning circuit an arbitrary clock signal, independent of the image synchronization of the signal received and controlling the reading and writing of the display storage means in order to obtain repetitions or blankings of the images on display thus absorbing any delay or advance, and in that the processing means are means incorporating a faster than necessary image compression (average time of one image).

According to a second characteristic, the process consists of dividing the display storage means into at least two storage fields, controlling the processing of an image I as said image is recorded in the input memory, controlling the recording of said image I during its processing in one of the storage fields and then either only authorizing the reading of the field in which said image has been recorded if the processing of a new image has been completed and if not controlling a new reading of the content of the other field and only authorizing the processing of a new image when the switching from one field to the other has taken place, or when the processing of an image has been completed continuing the reading of the other field containing an already recorded image in such a way as to read this image once more than the others, or control the reading of said first field so as to display the recorded image which has been processed and display once less than the others an image which has previously been processed and recorded in the other field.

According to another feature, in the case where the acquisition clock is slower than the display clock, the process consists of controlling the reading of an image recorded in one of the fields in such a way as to display said image several times until the following image is processed and recorded in the other field.

According to another feature, in the case where the acquisition clock is faster than the display clock, the process consists of choosing processing means which are faster than necessary and able to process the data of an image as they arrive in the input buffer, choosing a buffer filling threshold and blanking or suppressing the reading of at least one image, said image having possibly been displayed once or several times or not at all on exceeding the threshold.

When the device is a low rate videophone, one image acquired from among n is transmitted and the control means are able to control the display of n times the same image while the processing means process the following image. According to another feature, the process then consists of choosing processing means able to process an image during the display time of p images, p being lower than n, the processed image then being recorded and its display controlled after display of p times the preceding image.

In the case of a videophony application, the process consists of taking as the arbitrary clock, the scanning clock of the camera close to the monitor.

When the device is a videophone conference system or a television set or a high rate videophone, all the images acquired are transmitted, the process then consisting of choosing processing means able to process an image during the display time of another image and as soon as the predetermined input buffer threshold has been exceeded by the arrival of an image I, authorizing the processing of the following image I+1, the image I not being displayed, the display of the image I+1 taking place just after the display of the image I−1.

In the case of a videophone conference system or a television set or a high rate videophone in which the processing means do not have the desired power making it possible to process an image during the display time of another image, the process then consists, as soon as a predetermined input buffer filling threshold is exceeded by the arrival of an image I, controlling the repetition of the display of the image I during the processing of the image I+k, the k−1 intermediate images not being displayed and the image i+k being displayed just after its processing.

BRIEF DESCRIPTION OF THE DRAWINGS

The invention is described in greater detail hereinafter relative to non-limitative embodiments and the attached drawings, wherein show.

DESCRIPTION OF THE PREFERRED EMBODIMENTS

It is pointless hereinafter to give details of the scanning circuit BA of the device MB, no matter whether it is a videophone or a television set, because such circuits are well known to the expert. There is also no need for a detailed description of the decoder with respect to the decompression means D, the access circuits to the input buffer MT and the reading and writing address circuits of the display memory MV, although the latter has been subdivided according to the invention into at least two separate addressing fields, the methods of addressing two or more separate fields in a memory forming part of the prior art.

Reference can be made to the following patent specifications EP-A2-844,270, EP-A2-123,456 and U.S. Pat. No. 4,185,188 for further details on encoders/decoders and in particular decoders provided with a decompression circuit such as is used in equipment such as videophones or processing circuits for television signals.

Figure 1:
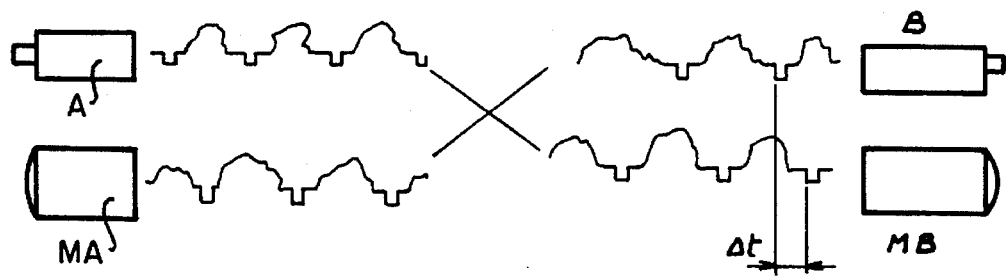
FIG. 1 already described, is a known system for the transmission of signals from an analog network in a videophony application.
Figure 2:
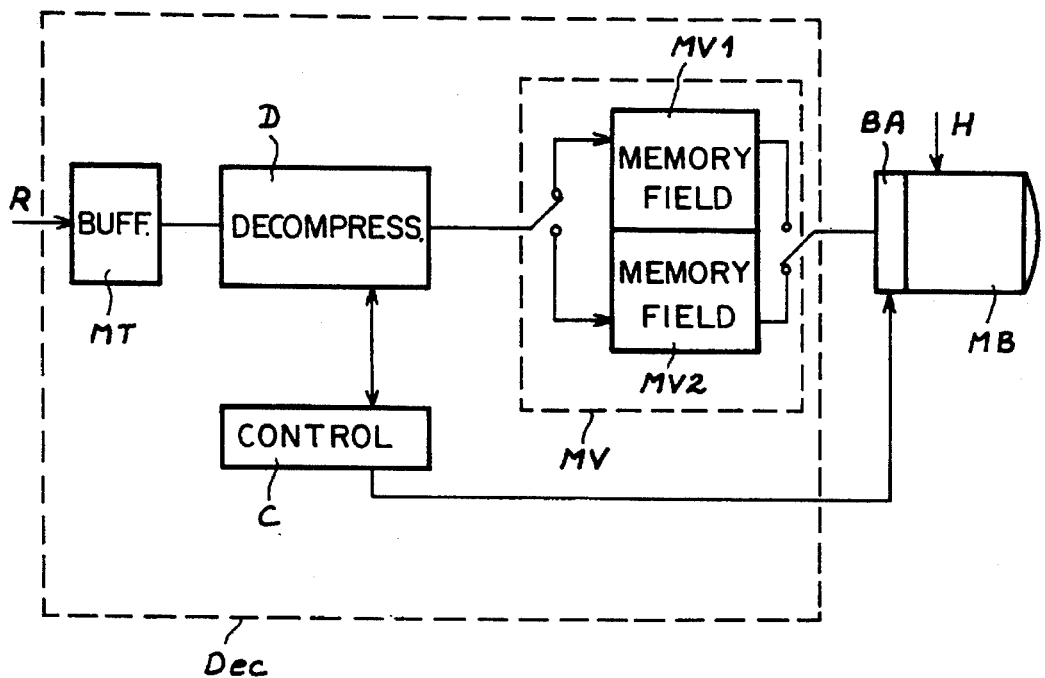
FIG. 2 is a diagram of a processing device and more particularly the digital image decoder of the display device MB and transmitted by a network R.
Figure 3:
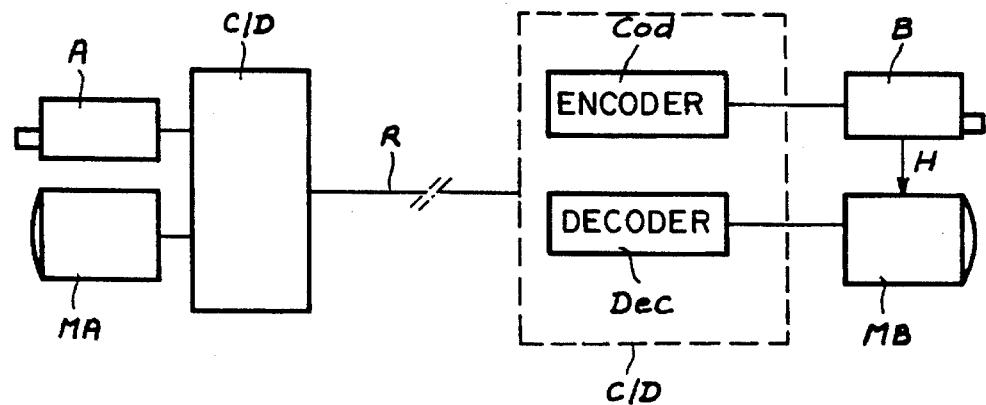
FIG. 3 shows diagrammatically a videophony system making it possible to use the process in said application.

For the remainder of the description reference should be made to FIGS. 2 and 3.

The images reaching the input of the decoder Dec by the network R arrive at a given rate, which is either 64 or 48 kbit/s, for very low rate networks of the RNIS type or other higher rates, which can be constant or variable. The number of bits per image is variable as a result of the compression operations performed by a coder or encoder cod on transmission.

When they arrive, the informations of each image are recorded in the buffer MT. One characteristic of the process consists of permanently clearing this memory MT, so that delays which could be introduced by the passage of informations into their memory are as short as possible.

In practice, a filling threshold is defined for a given rate. For example, use will be made of a threshold slightly above 1200 bits, when the input rate is 64 kbit/s, so that the weight between the end of the image processing and its display does not exceed the duration of an image. This filling threshold is monitored by the control means C of the decoder Dec.

The control means C could be constituted in practical manner by an existing processor of the decoder or by a processor added thereto.

The processor is loaded by the program realizing the different reading or writing addressing controls of the memories and the processing of informations by the decoder in accordance with the process described.

As described hereinbefore, the informations read in the memory MT are decompressed by the decompressor D and stored in a display memory MV. The latter is subdivided into at least two separate storage fields MV1 and MV2, referred to as a memory hereinafter. It would also be possible to use two memories for this purpose. Each field has at least the size of a complete image.

The memories MV1 and MV2 operate in flip-flop form, i.e. the device displays the content of MV1, while the decompressor fills MV2 with the following image, then vice versa.

The control means C make it possible to control the reading and writing addressing of the two memories MV1 and MV2 in the manner described hereinafter.

The control means C only authorize a reading of MV2 for the display if the decompressor D has terminated the decoding of a new image, otherwise it controls a new reading of the content of MV1.

The control means C only authorize the decompressor D to start the decoding of a new image (this stage starting by the reading of the content of the buffer MT) when it has controlled the switching of MV1 to MV2 or vice versa.

The decompressor will be sufficiently powerful to carry out the processing operations in a rapid manner, so as not to disturb all the reading and writing mechanisms, as proposed by the process. Compressors making it possible to obtain the necessary computing power are already commercially available.

As has already been stated, the synchronization process firstly consists of taking a clock for the scanning circuit of the display device which is arbitrary and independent of the transmitted image synchronization signals.

In videophony applications, the clock is preferably constituted by the scanning clock of the camera located in the device close to the monitor (cf. FIG. 3). However, in most cases, the acquisition camera clock does not have precisely the same frequency as the synchronization clock of the device.

Thus, two cases occur. These cases will be described on the basis of the application of the process to videophony (FIG. 3).

First Case: the clock of the acquisition camera A is slower than the scanning clock of the camera B.

In this case, the camera A produces fewer images than the camera B. The monitor MB tends to wish to display more images than come from it. The buffer MT is periodically cleared and the control means will then control the reading of the memory MV1 or MV2, so as to display the same image at least once more than the others, so as to give the informations time to arrive in the buffer. In the restored image sequence, there will be one more image than was the case in the starting sequence. Thus, one of the images is repeated twice or once more than the others.

In practice, the difference between the clocks of A and B is small (particularly if the clocks are made from quartz). This repetition occurs so infrequently that it is substantially invisible.

Second Case: the clock of the acquisition camera A is faster than the scanning clock of the camera B.

In this case, symmetrical to the preceding case, the camera A produces more images than the monitor B can display. This has the consequence of increasing informations waiting in the buffer MT (monitor B side). As the latter does not have an infinite size, sooner or later it overflows. To prevent this, it would be possible to increase the size of the buffer MT. However, it is preferable not to do so, because this would introduce a supplementary delay for the informations, which would be due to the passage time through said memory.

Therefore, in order to solve this problem in an advantageous manner, a choice is made of a decompressor D having a computing power making it possible to decode an image faster than necessary (average time of one image).

In addition, a choice is made of a buffer filling threshold as described hereinbefore and when the threshold is exceeded, the decompressor processes the following image sooner, the preceding image being displayed a reduced number of times or not displayed at all.

Once again two cases occur, namely either all the images are processed, or the coder-decoder system C/D operates in a time subsampling mode (which is the case for very low rate videophony applications).

Subsampled mode (very low flow rate videophony).

This means that all the images acquired are not processed by the encoder Cod. For example, in a 10 Hz operating mode, one frame out of five is encoded. If the sequence of numbers represents the images from the camera A:

1 2 3 4 5 6 7 8 9 10 11 12 13 14 15 16 . . .

the encoder Cod of camera A only compresses the images 1 6 11 16 . . . etc. . . .

The decoder Dec of monitor B will also only decompress the images 1,6,11,16 etc. The display system repeats five times the same image and the displayed sequence is in the following form:

1 1 1 1 1 6 6 6 6 6 11 11 11 11 11 16 16 16 16 16 . . .

In this videophony mode, the monitor B displays five times the image 1 (entered in MV1) while the decompressor D decodes and writes the result of its decoding (image 6) in MV2.

In order to make up the delay due to the slowness of scanning of the monitor B, a choice will be made of a decoder which is more powerful than necessary, so that it e.g. makes it possible to finish the decoding of the image 6 in a time corresponding to the display of four times the image 1. This is possible because the drift of the clock means that the informations corresponding to the image 6 accumulate in the memory MT. The image 1 will then only be repeated four times and the displayed sequence will have one image less than the starting sequence from the camera A 1 1 1 1 6 6 6 6 6 11 11 11 11 11 16 16 16 16 16 . . .

The operation is repeated as soon as the content of the buffer MT increases again.

There is no fundamental disadvantage in having a very fast decoder, because it stops when the buffer MT is empty. Mode without time subsampling (videophone conference, television, higher rate videophony).

Thus, the sequence to be displayed is 1 2 3 4 5 6 7 8 9 10 11 12 13 14 15 16 . . .

The ideal solution consists of using a decompressor D having a computer power twice faster than necessary.

If it is e.g. accepted that the image 5 corresponds to the time when the buffer MT exceeds the threshold, the decoder Dec is authorized by the control means to immediately decode the image 6. The latter is written in the half-memory which contained the image 5 which has erased the same. Therefore the displayed sequence is 1 2 3 4 6 7 8 9 10 11 12 13 14 15 16 . . .

Therefore the delay is made up.

In the case where the computing power of the decoder does not reach twice the normal value, intermediate configurations can appear 1 2 3 4 4 7 8 9 10 11 . . .

or 1 2 3 4 4 4 8 9 10 11 . . .

Although they are able to make up the delay, they involve the repetition of certain images and the suppression of others.

Auxiliary memories supplementary to MV1 and MV2 (MV3 not shown) in this case make it possible to not rewrite and therefore not erase several images. A single lost image is sufficient.

We claim:

1. A process for the synchronization of the scanning circuit of an image display device incorporating an input buffer, processing means making it possible to reconstitute an image I entering the buffer, display storage means in which the images are recorded after processing, and control means including a display clock and able to control the reading and writing of images in said display storage means, said images being acquired by a camera having a scanning circuit controlled by a given acquisition clock, said process comprising the steps of clearing permanently the input buffer;

applying an arbitrary clock signal independent of the image synchronization of the signal received by the scanning circuit of the image display device;

controlling the reading and writing of the display storage means in order to obtain at least one of repetitions of images on display when the acquisition clock is shown and suppressions of images on display when the acquisition clock is slower then the display clock and suppression of images or display when the acquisition clock is faster then the display clock so as to absorb any frequency difference between the synchronization clock of the device and another clock;

using a fast image compression so as not to disturb the reading/writing mechanisms, subdividing the display storage means into at least two storage fields, each having at least the size of a complete image, controlling the processing of said image I while said image is recorded in the input buffer, the recording of said image I being controlled during processing in one of the storage fields, then either:

authorizing the reading of said one of the fields in which said image I has been recorded only if the processing of a new image has been completed, otherwise controlling a new reading of the content of the other field and authorizing the processing of the new image only when a switching from the one field to the other field has taken place; or, with the processing of said image I completed:

continuing the reading of the other field containing an already recorded image so as to read said image once more than the other images; or controlling the reading of the one field so as to display the recorded image which has just been processed and display once more than the other images an image which has previously been processed and recorded in the other field.

2. The synchronization process according to claim 1, said process including, in the case where the acquisition clock is slower than the display clock, controlling the reading of said image recorded in one of said fields so as to display said image several times until the new image has been processed and recorded in the other field.

3. The synchronization process according to claim 1, said process including, in the case where the acquisition clock is faster than the display clock, choosing processing means which are faster than necessary and able to process the data of said image as they enter the input buffer, choosing a buffer filling threshold and suppressing the reading of at least one image, whereby said image may have been displayed one or more times or not at all upon exceeding the threshold.

4. The synchronization process according to claim 3 wherein the process operates in subsampled mode in which the device is a low rate videophone, one image acquired from among n images being transmitted, n being an integer, said process including the steps of processing said image during the display time of p images, p being smaller than n, the processed image then being recorded and its display controlled after the display of p times the image proceeding the processed image.

5. Synchronizing process according to claim 4 wherein the videophone has a display monitor and a camera, said process including the step of taking as the arbitrary clock the scanning clock of said camera.

6. The synchronization process according to claim 3 in which the device is a videophone conference or high rate videophone system or a television set, in which all the acquired images are transmitted, said process including the steps of choosing processing means able to process said image during the display time of another image and in that as soon as a predetermined input buffer filling threshold is exceeded by the arrival of said image I, the control means authorize the processing of the image following said image I, the image I not being displayed, the display of the image following said image I taking place just after the display of the image preceding said image I.

7. The synchronization process according to claim 3 in which the device is a videophone conference system or a television set, in which all the acquired image are transmitted, wherein, as soon as a predetermined input buffer filling threshold is exceeded by the arrival of said image I, the control means control the repetition of the display of said image I during the processing of the image I+k, the k−1 intermediate images not being displayed and the image I+k being displayed just after its processing.

8. The synchronization process according to claim 3 wherein the processing means include a decoder, which receives data at a certain information rate and the buffer filling threshold is chosen as a function of the information rate arriving at the decoder input, so that the wait between the end of the processing of said image and its display does not exceed the duration of one image.

* * * * *